April 26, 1966 C. H. STAPPER, JR 3,248,710

READ ONLY MEMORY

Filed Dec. 15, 1961 2 Sheets-Sheet 1

INVENTOR
CHARLES H. STAPPER JR.

BY Joseph C. Redmond, Jr.

ATTORNEY

READ ONLY MEMORY

Filed Dec. 15, 1961 2 Sheets-Sheet 2

United States Patent Office 3,248,710
Patented Apr. 26, 1966

3,248,710

READ ONLY MEMORY

Charles H. Stapper, Jr., Fishkill, N.Y., assignor to International Business Machines Corporation, New York, N.Y., a corporation of New York Filed Dec. 15, 1961, Ser. No. 159,590
4 Claims. (Cl. 340—173)

This invention relates to information storage means or electronic memories, and more particularly, to electronicc memories adapted to store fixed information.

Fixed information memories are finding increased use in present day and proposed information handling apparatus. Such memories, commonly referred to as read only memories, are especially suitable for table lookup, standard routines and trouble diagnostic programs. When table lookup, standard routines and trouble diagnostic programs are incorporated in a read only memory, the program length for computer and like apparatus may be shortened thereby liberating storage space in the central memory. To be competitive with other alternatives, however, it is necessary that read only memories be inexpensive, compact and provide rapid readout signals.

A general object of the invention is an improved fixed information system that facilitates storage of fixed information; provides several alternatives for storing such information and is adapted to record output signals from the memory.

One object is a read only memory that is inexpensive and easy to fabricate.

Another object is a read only memory having low power requirements and providing rapid readout signals.

Still another object is a read only memory employing inductive or capacitive couplings.

Another object is a matrix switch especially suitable for driving a plurality of read only memories.

Another object is a fixed information memory system that enables a binary code information to be stored in a read only memory by a simple mechanical operation.

These and other objects are accomplished in the present invention, one illustrative embodiment of which comprises a matrix switch in combination with one or more read only memories. The switch comprises an $m$ number of $x$ lines and an $n$ number of $y$ lines which intersect in a matrix configuration to form an $mn$ number of crosspoints. A negative resistance device biased for bistable operation is connected to each crosspoint and adapted to be responsive to coincident input signals. A transmission line is connected to each negative resistance device and supplies output signals to one or more read only memories when coincident signals change the device from one stable operating condition to the other. The transmission lines are connected to corresponding conductive strips of the read only memories, the strips being secured to one side of a printed circuit board as one set of lines in a matrix arrangement. A second set of conductive strips is secured to the other side of the printed circuit board. The second set is perpendicularly disposed with respect to the first set to complete the matrix configuration. Output signals from the memories appear on the second set of lines. Means are included in the read only memories for normally isolating the one set of lines from the other set. Fixed information is placed in the read only memories by the presence and absence of punched holes. The punched holes remove the isolating means between the lines so that when output signals supplied from the matrix switch appear at the memories, preselected information will appear on the second set of lines in accordance with the input signals and the fixed information placed in the memories and represented by the presence and absence of punched holes.

One feature of the invention is at least two sets of lines so arranged and constructed on a supporting member, typically a printed circuit board, that the lines are normally electrically isolated from each other but easily adapted to store fixed information.

Another feature is storing fixed information in a read only memory by the presence and absence of punched holes in the memory.

Another feature is a printed circuit board adapted ot be punched through to establish inductive or capacitive coupling between intersecting lines of a matrix, the punchings corresponding to a binary code designation desired to be stored in the board.

Another feature is a read only memory comprising spaced intersecting conductive strips on a printed circuit board, preselected intersections having a punched hole to represent one binary code designation stored in the memory, the absence of a hole representing the other binary code designation stored in the memory, and a bistable semiconductor device arranged to record the binary signals emanating from the memory in response to independent input signals supplied to the memory.

Another feature is a matrix switch having output circuits which may be directly incorporated into a read only memory, the output circuits providing rapid output signals suitable for reading out information in the memory in accordance with an information pattern established in the memory.

Another feature is a matrix switch connected to a plurality of read only memories, the combination being compact, easy to fabricate and adapted to store fixed information in the memories by the presence and absence of puched holes.

Another feature is a read only memory including register means, the read only memory comprising a plurality of conductive strips arranged in a matrix configuration, one set of lines in the matrix configuration having bistable semi-conductor devices connected to each line and normally biased for one stable condition whereby signals appearing on preselected lines of the read only memory and the presence and absence of punched holes in the memory, set the bistable devices to indicate the fixed information in the memory.

The foregoing and other objects, features and advantages of the invention will be apparent from the following more particular description of preferred embodiments of the invention as illustrated in the accompanying drawings.

Figures 1, 1A, 2, 2A, 3, 5A, 5B:
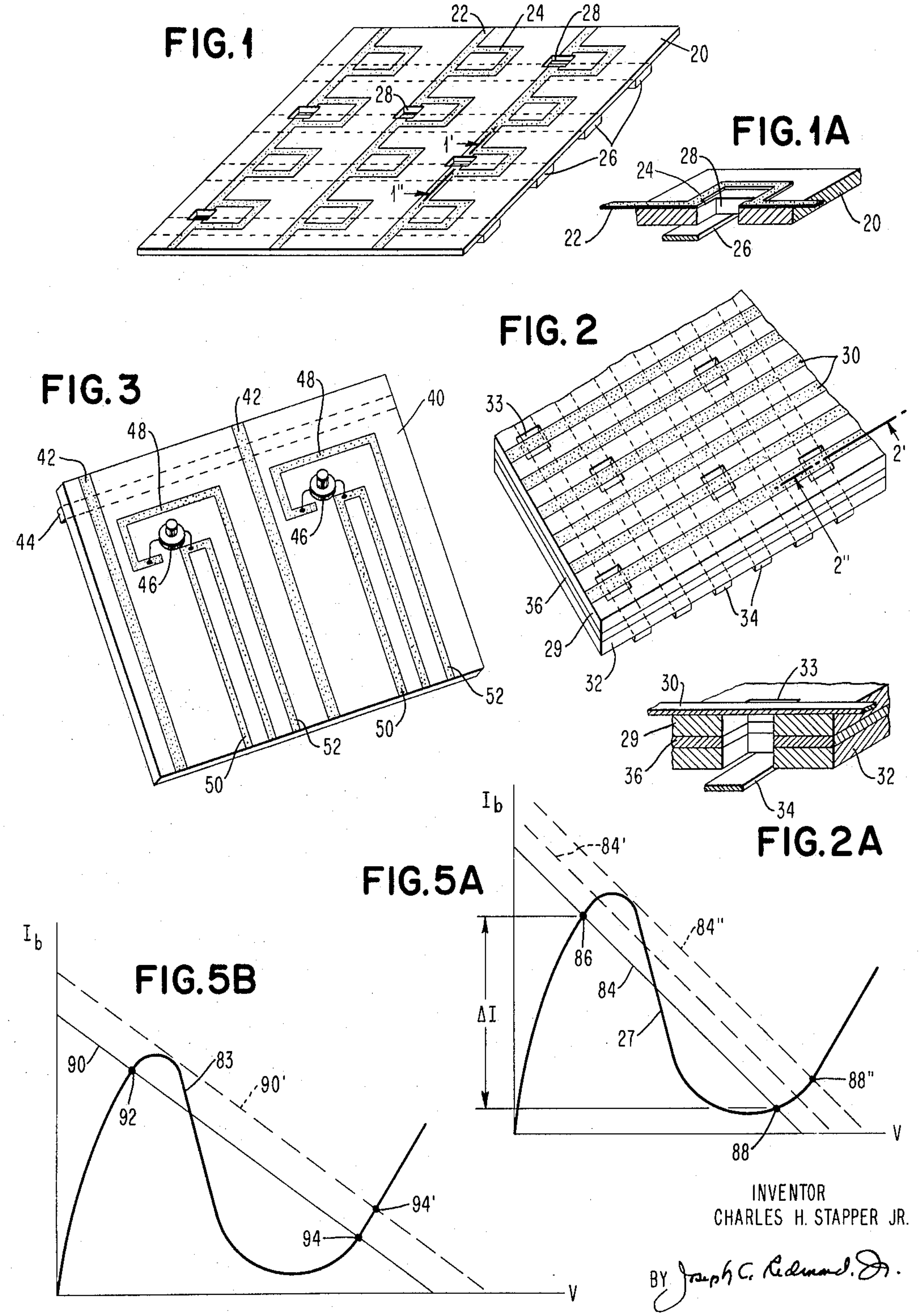
FIG. 1 is a perspective drawing of one embodiment of a read only memory employing the principles of the present invention.
FIG. 1A is a sectional view of FIG. 1 along the line 1′-1″.
FIG. 2 is a perspective of another embodiment of a read only memory employing the principles of the present invention.
FIG. 2A is a sectional view of FIG. 2 along the line 2′—2″.
FIG. 3 is a perspective of a matrix switch for supplying input signals to the read only memories shown in FIGS. 1 and 2.
FIGS. 5A and 5B are voltage-current graphs of tunnel diodes employed in the circuit shown in FIG. 4.

Referring to FIGS. 1 and 1A, one embodiment of a read only memory is fabricated from a supporting member, typically a printed circuit board 20, the material in the board being dielectric mylar or other material commonly employed in the printed circuit art. The thickness of the printed circuit board is of the order of .002" but may vary from this thickness according to the magnitude of the input signals supplied to the memory. Secured to one side of the board is a plurality of conductive strips 22 which may be arranged in parallel relation. The thickness of the lines is of the order of .003", the lines being secured to the board by etching or other techniques well-known in the art. Included in the lines 22 are coupling loops 24, each line including a plurality of coupling loops at spaced intervals. The thickness of the coupling loops is of the order of .005". Secured to the other side of the printed circuit board are a plurality of conductive strips 26 in parallel relation, the lines 26 being perpendicularly disposed and underneath the lines 22. Also, the position of the lines 26 is such that one side of each coupling loop 24 is directly above the lines 26 so that electrical energy appearing on the lines 26 will be electromagnetically linked to the coupling loops. Normally, the coupling loops 24 appear as a short circulated transformer so that electromagnetic energy appearing on the lines 26 is isolated from the lines 22.

Thus, normally, no output signals will appear on the lines 22 when input signals are supplied to the lines 26. Output signals, however, can be developed on the lines 22 through the simple expedient of a punched hole 28 at the appropriate point in the coupling loop 24. The punched hole 28 is placed in the side of the coupling loop that is included in the line 22. Such a hole interrupts the short circuit path without disturbing a complete circuit for the passage of current along the lines 22. With a punched hole in a coupling loop, energy applied to the lines 26 will be inductively linked to the lines 22 through the coupling link 24 to establish a current flow on the line in accordance with well-established principles of electrical engineering. Accordingly, therefore, the absence of a punched hole in a line produces no output sinals which may correspond to a binary zero. The pressure of a punched hole, however, will produce an output signal on the lines 22 and such a signal may be employed to correspond to a binary one. The embodiment shown in FIG. 1, therefore, permits fixed information to be placed in a matrix configuration in accordance with the punched holes placed in the matrix. The fixed information in the matrix can be related to mathematical functions or tables so that upon interrogation by input signals, analogous to an independent variable, the matrix will provide the corresponding dependent value.

Another embodiment of a read only memory is shown in FIGS. 2 and 2A. The memory of FIGS. 2 and 2A comprises a printed circuit board 29, typically of mylar or other dielectric and having a plurality of conductive strips 30 secured on one side thereof. Preferably, but not exclusively, the conductive strips 30 are in parallel relation as in the case of the strips 22 shown in FIG. 1. Cooperating with the board 29 is another printed circuit board 32 having a plurality of conductive strips 34 secured thereto, the strips 34 thereof being perpendicularly disposed and underneath the strips 30 when the boards are placed in stacked relation. Interposed between the printed circuit boards 29 and 32 is a metallic member 36 which serves as a ground plate. The printed circuit boards 29 and 32 are so disposed with respect to the ground plate that the conductive strips 30 and 34 are external to the ground plate. To complete the embodiment, the boards 29 and 32 and the ground plate 36, are placed together to form a unitary member. In such an arrangement, signals applied to the conductive strips 34 will not normally be electrostatically or inductively linked to the conductive strips 30 due to ground plate 36 absorbing the available energy and the absence of any coupling means. Signals can be coupled from the lines 34 to the lines 30, however, by punched holes 33 in the boards 29, which penetrate the ground plate 36 to establish a capacitance between the lines 30 and 34. Current flow on the lines 30 will be altered by such a capacitance and the alteration may be employed to correspond to a binary one. Similarly, the lack of punched holes on the lines may be employed to correspond to a binary zero, since current flow on such lines will be unaffected when input signals are supplied to the lines 34. Thus, as in the previous embodiment, fixed information may be stored in the memory in accordance with the punched holes disposed at preselected intersections between the lines 30 and 34.

The energy required to develop output signals from the memory of FIGS. 1 and 2 is of the order of that supplied by tunnel diode devices. The characteristics and performance of tunnel diodes are well-known in the art being described, for example, in an article appearing in the Physical Review, volume 108, 1958, by L. Esaki, pages 602, 603. Conveniently, therefore, one set of the lines appearing on the read only memories shown in FIGS. 1 and 2 may be the output terminal from a tunnel diode switch. The drivers connected to the tunnel diode switches may be reduced in quantity through the expedient of arranging the switches and the drivers in a matrix configuration. FIG. 3 discloses a portion of a matrix switch employing tunnel diodes. The matrix switch comprises a printed circuit board 40 having a first set of conductive strips 42 disposed in parallel relation on one side of the board and a second set of conductive strips 44 disposed in perpendicular relation to the lines 42 on the other side of the board 40. A tunnel diode 46 shown in a package form is disposed at each intersection between the lines 42 and 44. Each tunnel diode is coupled to the intersecting lines through a coupling loop 48. The tunnel diode receives a biasing current from a source (not shown) which supplies energy to the diode through another set of conductive lines 50. The tunnel diode is connected between the lines 50 and one side of the coupling loop 48. The other side of the coupling loop is connected to a transmission line 52, which is made in accordance with the printed circuit techniques described, for example, in a previously filed application Serial No. 141,860, now Patent No. 3,157,857 dated November 11, 1964, assigned to the same assignee as that of the present invention. The transmission line 52 is also connected at one side to the biasing line 50. Although not shown, the transmission line 52 is intended to be directly connected to the conductive strips 26 or 34 shown in the read only memory of FIGS. 1 and 2, respectively. In connection with the transmission line arrangement it should be noted that other alternatives are available. For example, the transmission line may also be serially connected in the bias line which is thereafter connected to the side of the tunnel diode coupled to the intersecting lines 42 and 44. Instead of providing an output signal as in FIG. 3, the remaining side of the tunnel diode may be grounded. Accordingly, the circuit arrangement shown in FIG. 3 was selected solely for reasons of convenience in explanation and should not be deemed to limit the present invention.

Figure 4:
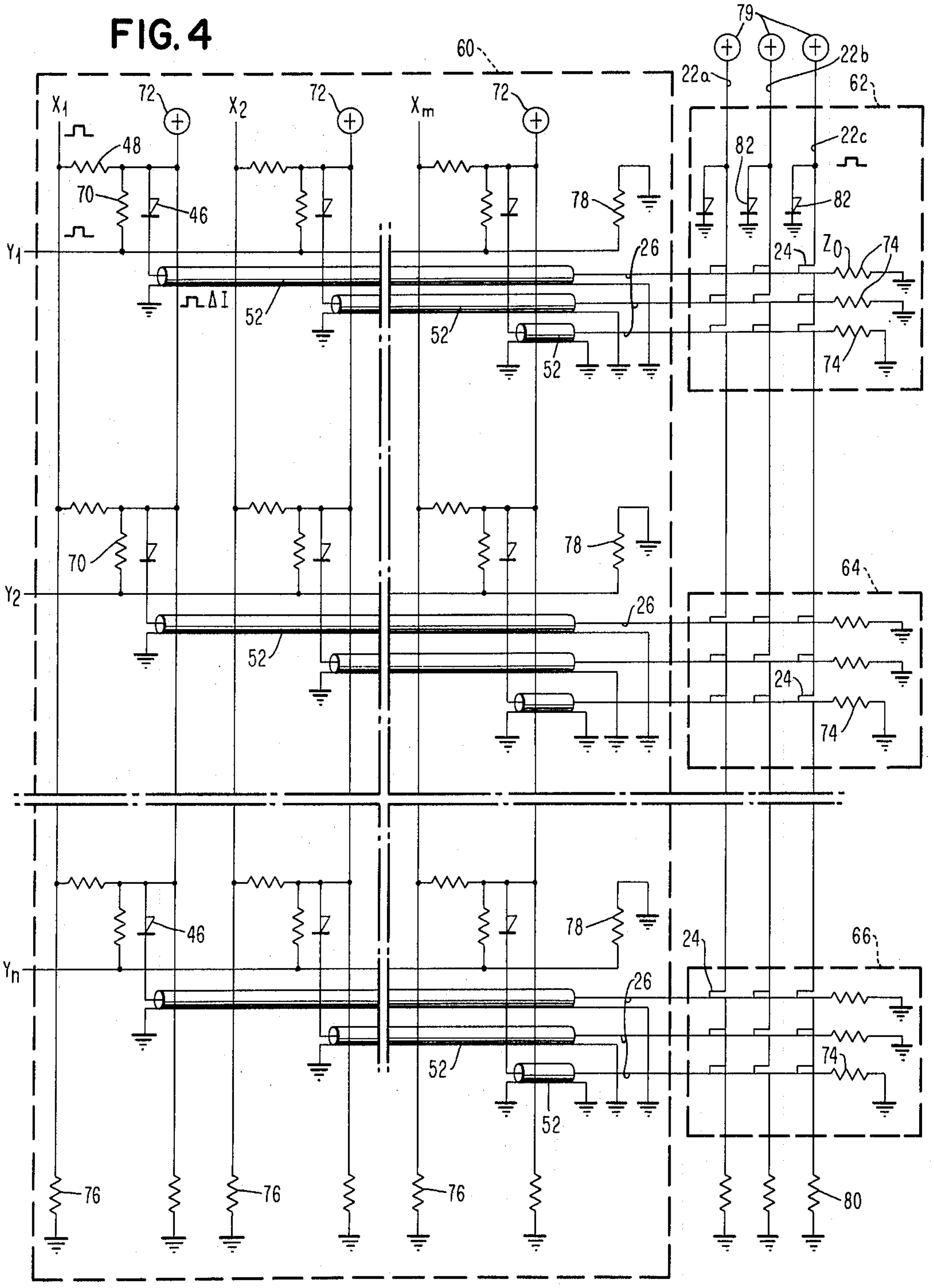
FIG. 4 is an electrical schematic of a matrix switch connected to a plurality of read only memories of the type shown in FIGS. 1 and 2.

The electrical schematic for the combination on a single printed board of a matrix switch with one or more of the read only memories shown in FIGS. 1 and 2 is indicated in FIG. 4. The matrix switch, although not the same as that shown in FIG. 3, is for all purposes the equivalent. The switch is shown in the dotted box designated with the reference character 60. The read only memories are shown in the dotted box as indicated by the reference characters 62, 64 and 66. Conveniently the memories and switch may be arranged on a single printed circuit board or stacked in a printed circuit card holder (not shown) and suitably interconnected. The latter arrangement facilitates the substitutions of different read only memory cards so that a variety of stored programs may be incorporated in a computer system in a relatively small volume. The fixed information memory system shown in FIG. 4 corresponds to such a disposition. The memory system comprises an *m* number of *x* lines and an $n$ number of $y$ lines which intersect to form an $mn$ number of crosspoints. Connected to each crosspoint and to suitable resistors 68 and 70 is the tunnel diode 46 previously described in connection with FIG. 3. Each tunnel diode connected to the same $x$ line is also biased at the same end from a common current source 72. The other end of the diode is connected to a transmission line 52, previously described in FIG. 3, which is directly coupled to the conductive strips 26 or 34, previously referred to in connection with FIGS. 1 and 2. The lines 26 or 34 are coupled to the lines 22 or 30 through the loops 24 or the punched holes in connection with the inductively and capacitively coupled read only memories, respectively. The other end of the lines 26 and 34 connected to the lines 52 is terminated in the characteristic impedance 74 of the combined transmission line and the conductive strips. Similarly, the $x$ and $y$ lines of the matrix switch are suitably terminated by resistors 76 and 78, respectively, which are returned to ground. The conductive strips 22 or 30, as the case may be, are also suitably biased from a source 79 and terminated by resistors 80 which are returned to ground. Register means may be included in the read only memories through the expedient of a tunnel diode 82 connected between the lines 22 or 30, as the case may be, and ground. The tunnel diodes may be biased for bistable operation so that a signal appearing on the lines 22 or 30 will switch the diode to a different stable condition.

The operation of the memory system will be described in conjunction with FIGS. 5A and 5B which relate the voltage-current characteristics 27 and 83 of the diodes 46 and 82, respectively. Both the diodes 46 and 82 are biased for bistable operation through the resistors and current supplies associated therewith. The diode 46, however, requires coincident signals to change from one stable condition to the other. FIG. 5A indicates the effect of coincident signals when applied to the tunnel diode 46. The load line 84 is shifted to a position 84′ for one input signal and to a second position 84″ for coincident input signals. It is apparent from FIG. 5A that coincident signals are required to switch the device from one stable condition to the other. When coincident input signals are received, the diode switches from an operating point 86 to a temporary operating point 88″. On release of the input signals, the diode will return to an operating point 88 and remain there. The diode may be returned to the operating point 86 by lowering the bias current so that the load line 84 is shifted below the valley of the tunnel diode curve.

In contrast the diode 82 is biased by the source 79 and resistor 80 to establish a load line 90. The intersections between the curves 83 and 90 create operating points 92 and 94. A single input signal from the matrix switch will raise the load line 90 to a position 90′ so that the diode will switch from the operating point 92 to a temporary operating point 94′. On release of the signal, the diode will change to the other stable operating point 94. Lowering of the bias current on the lines 22 or 30 will return the diode to the operating point 92, as in the previous case.

Assuming coincident signals are supplied to the $x_1$ and $y_1$ lines of the matrix, the diode 46 will switch to provide an output current signal having an incremental change $\Delta I$ indicated in FIG. 5A. The incremental change $\Delta I$ is applied to the transmission line 52 coupled to the lines 22 of the read only memory 62. The bias current on the lines 22 of the memory will be affected by the punched holes in the board. In the read only memory 62 only one line (**22*c*) has a punched hole therein at its intersection with the $x_1$–$y_1$ line 26, so that the diode 82 of that line (22*c*) is switched between stable operating points 92 and 94 to register a binary one, whereas the diodes 82 connected to the other lines (22*a*, *b*) are unchanged to register a binary zero. Thus a binary output 001 is stored in the diodes 82 connected to the lines 22*a*, *b* and *c***, respectively. Another combination of input signals to the matrix will provide another set of output signals from the memory in a similar manner.

Thus, it will be appreciated that the matrix switch and read only memory provide fixed dependent signals based upon the independent signals supplied to the switch and the punched holes in the memory. It will be further appreciated that the switch can operate any one of several read only memories. The combination, therefore, is especially useful in storing fixed routines, table lookup in computer and like systems. The switching speed of the memory system is relatively fast due to the inherent characteristics of the tunnel diode. Additionally, the number of information storage locations in the memory can be relatively large due to low energy requirements necessary to operate the memory. The present invention, therefore, permits a large quantity of fixed information to be stored in a small volume. The fixed information is readily entered into the memory through the simple expedient of punching a hole in a printed circuit board at the proper locations. The combined matrix switch and read only memories being easily fabricated on printed cricuit boards render the combination suitable for mass production manufacture with resultant cost advantages over types types of read only memory.

While the invention has been particularly shown and dsecribed with reference to preferred embodiments thereof it will be understood by those skilled in the art that various changes in form and detail may be made therein without departing from the spirit and scope of the invention.

What is claimed is:

1. A fixed information storage means comprising a supporting member, a first set of conductors extending in parallel relationship on one side of said supporting member, a second set of conductors extending in parallel relationship on the other side of said supporting member, said sets of conductors respectively being arranged in transverse relationship to form a matrix of crosspoints, inductive coupling means included in said second set of conductors and positioned at the respective crosspoints, each of said inductive coupling means having associated therewith a respective short-circuit path normally isolating the first and second conductors at that cross-point but capable of being opened by a hole in said path so that signals appearing on one of said two conductors are inductively coupled to the other of said two conductors at said crosspoint, and negative resistance devices respectively associated with the conductors of one of said sets to register signals appearing on the respectively associated conductors of said one set.

2. In a fixed information storage means the combination of a supporting member including a first set of parallel disposed conductive strips secured to one side of the supporting member, a second set of parallel disposed conductive strips secured to the other side of the supporting member, said second set of conductive strips being perpendicularly oriented with respect to the first set to establish a plurality of intersections in a matrix configuration, a tunnel diode disposed at each intersection, means for coupling each conductive strip at an intersection to one side of the tunnel diode, means for biasing the tunnel diode for bistable operation, transmission lines means connected to the other side of the tunnel diode and secured to the supporting member, a third set of conductive strips secured to the supporting member, said third set being on the side of the supporting member opposite that to which the transmission line means is secured, said third set being spaced from said first set of conductive strips and perpendicularly related to the transmission lines means to establish a plurality of crosspoints, said third set being normally electrically isolated from the transmission line means at each crosspoint, and means for removing the isolation between the transmission line means and the third set strips at preselected crosspoints to record one binary code designation in the storage means.

3. In a fixed information storage means the combination of a supporting member having first and second sides, first and second sets of conductive strips secured to the supporting member on first and second sides, respectively, the first and second sets of conductive strips being perpendicularly oriented with respect to each other to establish a plurality of intersections in a matrix, a tunnel diode disposed at each intersection, a coupling loop secured to the first side at each intersection, said tunnel diode being connected in series with the coupling loop, a transmission line connected in series with the coupling loop, means connected to the coupling loop for bistably biasing the tunnel diode at each intersection, a third set of conductive strips secured to the second side of the supporting member and perpendicularly disposed with respect to the transmission lines to establish a plurality of crosspoints therebetween, inductive coupling means included in each of the third set of conductive strips, each inductive coupling means being directly underneath a portion of a transmission line to establish an effective short circuited transformer to isolate electrically the lines from each other at the crosspoint, means for removing the isolation between the lines at preselected crosspoints to record a binary one in the information storage means, a bistable semiconductor device connected to each line in the third set of conductive strips, and means for biasing the device for bistable operation, whereby coincident signals supplied to the lines in the first and second sets of conductive strips coupled to the same tunnel diode will produce an output signal from the diode which will be inductively coupled to those lines of the third set that are inductively coupled at a crosspoint and not isolated from each other so that the bistable semiconductor device connected to those lines will be set in one binary code designation whereas those bistable semiconductor devices connected to the other lines will not be set and thereby indicate the other binary code designation.

4. In a fixed information storage means comprising a first supporting member having a plurality of sets of conductive strips secured thereto, at least two sets of conductive strips being perpendicularly related with respect to each other to form a plurality of crosspoints, a bistable semiconductor device connected to each crosspoint and biased for bistable operation, said device being responsive to coincident signals supplied to the strips connected to the device to provide an output signal, circuit means adapted to receive the output signal, a third set of conductive strips cooperating with the circuit means to establish a plurality of information storage points indicative of one binary code designation, means for changing the binary code designation at preselected storage points, and means for recording the binary code designation of all lines in the third set when output signals appear on the line.

References Cited by the Examiner

UNITED STATES PATENTS

| | | | |
|---|---|---|---|
| 2,844,811 | 7/1958 | Burkhart | 340—166 |
| 2,909,592 | 10/1959 | Morris et al. | 340—173 |
| 2,992,409 | 7/1961 | Lawrence | 340—166 |
| 3,003,143 | 10/1961 | Beurrier | 340—173 |
| 3,016,520 | 1/1962 | Chaimowicz | 340—166 |
| 3,048,823 | 8/1962 | Smeltzer | 340—173 |
| 3,061,821 | 10/1962 | Gribble | 340—174 |
| 3,069,665 | 12/1962 | Bobeck | 340—174 |
| 3,098,996 | 7/1963 | Kretzmer | 340—173 |
| 3,130,388 | 4/1964 | Renard | 340—173 |

IRVING L. SRAGOW, *Primary Examiner.*

BERNARD KONICK, *Examiner.*

R. G. LITTON, T. W. FEARS, *Assistant Examiners.*